United States Patent
Bercy et al.

(10) Patent No.: US 8,255,324 B2
(45) Date of Patent: Aug. 28, 2012

(54) SYSTEMS AND METHODS FOR FACILITATING FINANCIAL TRANSACTIONS OVER A NETWORK WITH A GATEWAY ADAPTER

(75) Inventors: Yannick P Bercy, San Jose, CA (US); Avinash Arumugam, San Francisco, CA (US); Mark M Thomas, Mountain View, CA (US)

(73) Assignee: eBay Inc., San Jose, CA (US)

( * ) Notice: Subject to any disclaimer, the term of this patent is extended or adjusted under 35 U.S.C. 154(b) by 67 days.

(21) Appl. No.: 12/202,977

(22) Filed: Sep. 2, 2008

(65) Prior Publication Data

US 2010/0057598 A1  Mar. 4, 2010

(51) Int. Cl.
*G06Q 40/00* (2012.01)
(52) U.S. Cl. ............................... 705/40; 705/39; 705/35
(58) Field of Classification Search .................... 705/40, 705/39, 35
See application file for complete search history.

(56) References Cited

U.S. PATENT DOCUMENTS

| | | | |
|---|---|---|---|
| 5,978,840 A * | 11/1999 | Nguyen et al. ................ 709/217 |
| 6,957,199 B1 | 10/2005 | Fisher | |
| 7,249,097 B2 | 7/2007 | Hutchison et al. | |
| 7,315,826 B1 | 1/2008 | Guheen et al. | |
| 7,890,393 B2 * | 2/2011 | Talbert et al. ................... 705/35 |
| 2003/0229590 A1 * | 12/2003 | Byrne et al. ..................... 705/40 |
| 2004/0215560 A1 * | 10/2004 | Amalraj et al. ................. 705/40 |
| 2008/0040284 A1 * | 2/2008 | Hazel et al. ..................... 705/64 |
| 2008/0103923 A1 * | 5/2008 | Rieck et al. ..................... 705/26 |

OTHER PUBLICATIONS

Authorize.Net, A CyberSource Solutioin, available at http://www.authorize.net/company/aboutus/.
PaySimple.com, availlable at http://www.paysimple.com.

* cited by examiner

*Primary Examiner* — Sarah Monfeldt
(74) *Attorney, Agent, or Firm* — Haynes and Boone, LLP

(57) ABSTRACT

In accordance with one or more embodiments of the present disclosure, a system for facilitating financial transactions over a network includes a first component adapted to communicate with a merchant via a merchant device over the network and a second component adapted to receive a merchant transaction request from the merchant via the merchant device over the network, determine a format of the merchant transaction request, translate the format into a recognizable format, and process the merchant transaction request based on information passed with the merchant transaction request. In one aspect, the merchant transaction request includes information related to a financial transaction between the merchant and a customer purchasing an item from the merchant. In another aspect, format translation provides the capability to easily switch transaction service providers without incurring important integration costs.

20 Claims, 8 Drawing Sheets

SYSTEMS AND METHODS FOR FACILITATING FINANCIAL TRANSACTIONS OVER A NETWORK WITH A GATEWAY ADAPTER

TECHNICAL FIELD

The present disclosure relates to systems and methods for facilitating financial transactions over a network with a gateway adapter.

BACKGROUND

In online financial transactions, customers search for and purchase products and services through electronic communications with online merchants over electronic networks, such as the Internet. During the course of these transactions, customers provide payment in various ways including credit cards, electronic fund transfers, and other payment techniques offered by online payment service providers.

When online shopping at a particular merchant website, customers select items to purchase by clicking on a link for a specific item, and the selected items are placed on reserve in some type of virtual shopping cart. When done shopping, the customer proceeds to a checkout page to provide some form of payment for the selected items. At this point, the customer provides information for identification and payment.

Next, the merchant receives the purchase request from the customer and then selects an online payment service provider to process the purchase request initiated by the customer over the network. Typically, the merchant purchases transaction processing software from a particular online payment service provider that formats purchase transactions in a particular format that is only recognizable by the particular online payment service provider. As such, if the merchant wants to change the online payment service provider, the merchant may be required to purchase new processing and formatting software from the new online payment service provider. Generally, purchasing new processing and formatting software can be expensive. Therefore, there currently exists a need to improve the process of changing online service providers in a more efficient and convenient manner.

SUMMARY

In accordance with one or more embodiments of the present disclosure, a system for facilitating financial transactions over a network includes a first component adapted to communicate with a merchant via a merchant device over the network and a second component adapted to receive a merchant transaction request from the merchant via the merchant device over the network, determine a format of the merchant transaction request, translate the format into a recognizable format, and process the merchant transaction request based on information passed with the merchant transaction request. In one aspect, the merchant transaction request includes information related to a financial transaction between the merchant and a customer purchasing an item from the merchant. In another aspect, as described in greater detail herein, format translation provides the capability to easily switch transaction service providers without incurring important integration costs.

In one implementation, the second component may be adapted to obtain transaction results after processing the merchant transaction request. The transaction results may include information related to resolving the merchant transaction request including validation information, delivery information, and settlement information. The system may comprise a storage component, wherein the second component is adapted to store the transaction results in a storage component. The second component may comprise a processing component that utilizes a payment processing application to process the merchant transaction request. The second component may comprise a processing component that utilizes a translation application to translate the format of the merchant transaction request into the recognizable format. The second component may comprise a processing component adapted to maintain a plurality of accounts for one or more merchants and customers, wherein the accounts include account information related to the one or more merchants and customers. The account information may include private financial information of the merchants and the customers including at least one or more account numbers, passwords, credit card information, and banking information. The system may comprise a server adapted to communicate with the merchant device via the network, and the merchant device may comprise a server adapted to communicate with the first component via the network.

In accordance with one or more embodiments of the present disclosure, a method for facilitating financial transactions over a network comprises communicating with a merchant via a merchant device over the network, receiving a merchant transaction request from the merchant via the merchant device over the network, and determining a format of the merchant transaction request. The method further comprises translating the format into a recognizable format and processing the merchant transaction request based on information passed with the merchant transaction request. In one aspect, the merchant transaction request includes information related to a financial transaction between the merchant and a customer purchasing an item from the merchant.

These and other features and advantages of the present disclosure will be more readily apparent from the detailed description of the embodiments set forth below taken in conjunction with the accompanying drawings.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1A:
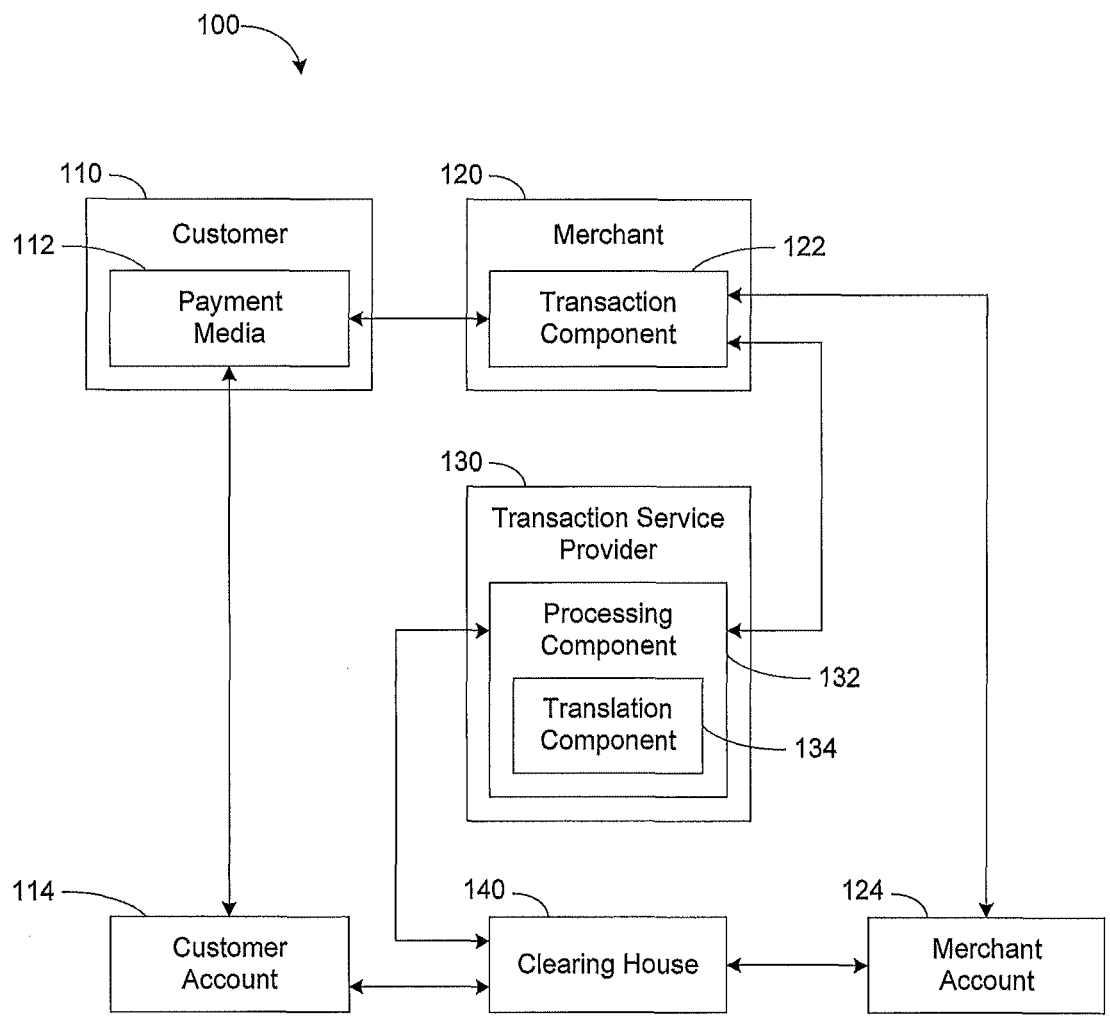
FIGS. 1A-1C show various block diagrams of various systems for facilitating financial transactions over a network, in accordance with one or more embodiments of the present disclosure.

FIG. 1A shows one embodiment of a system 100 for facilitating financial transactions over a network, such as the Internet. The system 100 includes a customer 110 that provides a form of payment media 112 in exchange for items for purchase (e.g., goods, products, and/or services), a merchant 120 that provides the items for purchase in exchange for some form of payment from the customer 110, and a transaction service provider 130 (e.g., a payment processing service) having a processing component 132 that is adapted to process financial transactions between the customer 110 and the merchant 120 over the network.

In one aspect, it should be appreciated that the merchant 120 may comprise a plurality of merchants with each having a transaction component 122. In another aspect, it should be appreciated that the system 100 may comprise a plurality of different transaction service providers 130 with each having a processing component 132.

Referring to FIG. 1A, the customer 110 establishes a customer account 114 with a financial institution, such as bank, wherein the customer 110 may deposit monetary funds in the customer account 114. As such, in one aspect, when involved in an online financial transaction, the customer 110 may need to provide personal information to the merchant 120 and/or transaction service provider 130, such as a user name, password, photograph image, biometric id, address, phone number, etc.) and banking information (e.g., banking institution, credit card issuer, user account numbers, security information, etc.). The merchant 120 and/or the transaction service provider 130 may accept from the customer 110 some form of payment media 112, such as an electronic check resource, credit card, or debit card, that is linked to the customer account 114. The customer 110 may use the payment media 112 to purchase items (e.g., products and/or services) from the merchant 120.

Figure 1B:
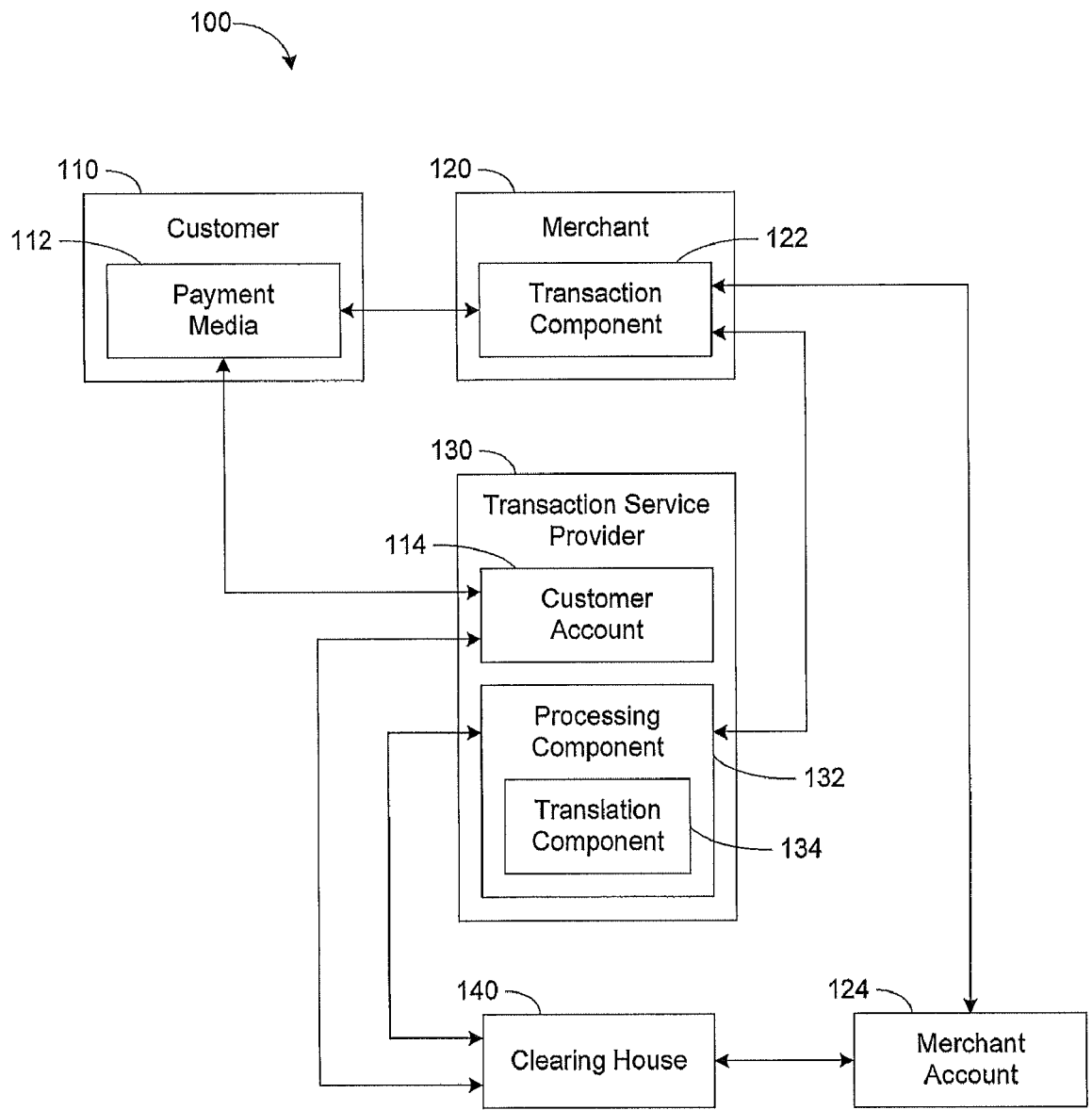

Referring to FIG. 1B, the customer 110 may establish the customer account 114 with the transaction service provider 130, wherein the customer 110 may deposit monetary funds in the customer account 114. As such, in one aspect, the customer 110 provides personal information and banking information to the transaction service provider 130. The transaction service provider 130 issues the customer 110 some form of payment media 112 that is linked to the customer account 114. The customer 110 uses the payment media 112 to purchase items (e.g., products and/or services) from the merchant 120.

In one implementation, the customer 110 uses the payment media 112 to purchase items from the merchant 120 over the network. The merchant 120 uses the transaction component 122, such as an online transaction application, to request processing of the online financial transaction over the network between the customer 110 and the merchant 120 from the transaction service provider 130. In one aspect, the processing component 132 of the transaction service provider 130 communicates with a clearing house 140 to debit the customer account 114 in accordance with a monetary amount specific to the payment and credit therewith a merchant account 124 linked to the merchant 120.

As described in greater detail herein, the transaction service provider 130 comprises a translation component 134 (e.g., a translation module, a translation application, etc.) that allows the processing component 132 to process online financial transactions intended for some other transaction service provider or payment processor on the network. In the event that the financial transaction is formatted for some other transaction service provider, the transaction service provider 130 utilizes the translation component 134 to interpret or translate the formatted financial transaction from the merchant 120 and thus process the financial transaction without the merchant 120 having to re-format the financial transaction. In various embodiments, the transaction service provider 130 or a website related thereto may be referred to as a gateway, and the translation component 134 may be referred to as a gateway adapter. Further scope related to the transaction service provider 130 and the translation component 134 is described in greater detail herein.

The clearing house 140, in one embodiment, resolves financial transactions through validation, delivery, and settlement. As such, the clearing house 140 may comprise an agency or institution having a system for settling indebtedness between members of that system through which accounts may be debited and/or credited of monetary funds in a generally known manner as accepted by the banking industry.

The merchant 120, in one embodiment, may establish the merchant account 124 with any type of financial institution, such as a bank. However, in another embodiment, as shown in FIG. 1B, the merchant 120 may establish the merchant account 124 with the transaction service provider 130. As such, the merchant 120 may need to provide business information to the transaction service provider 130, such as business name, address, phone number, etc., and financial information, such as banking information, merchant account information, credit card information, payment processing information, etc.

Figure 1C:
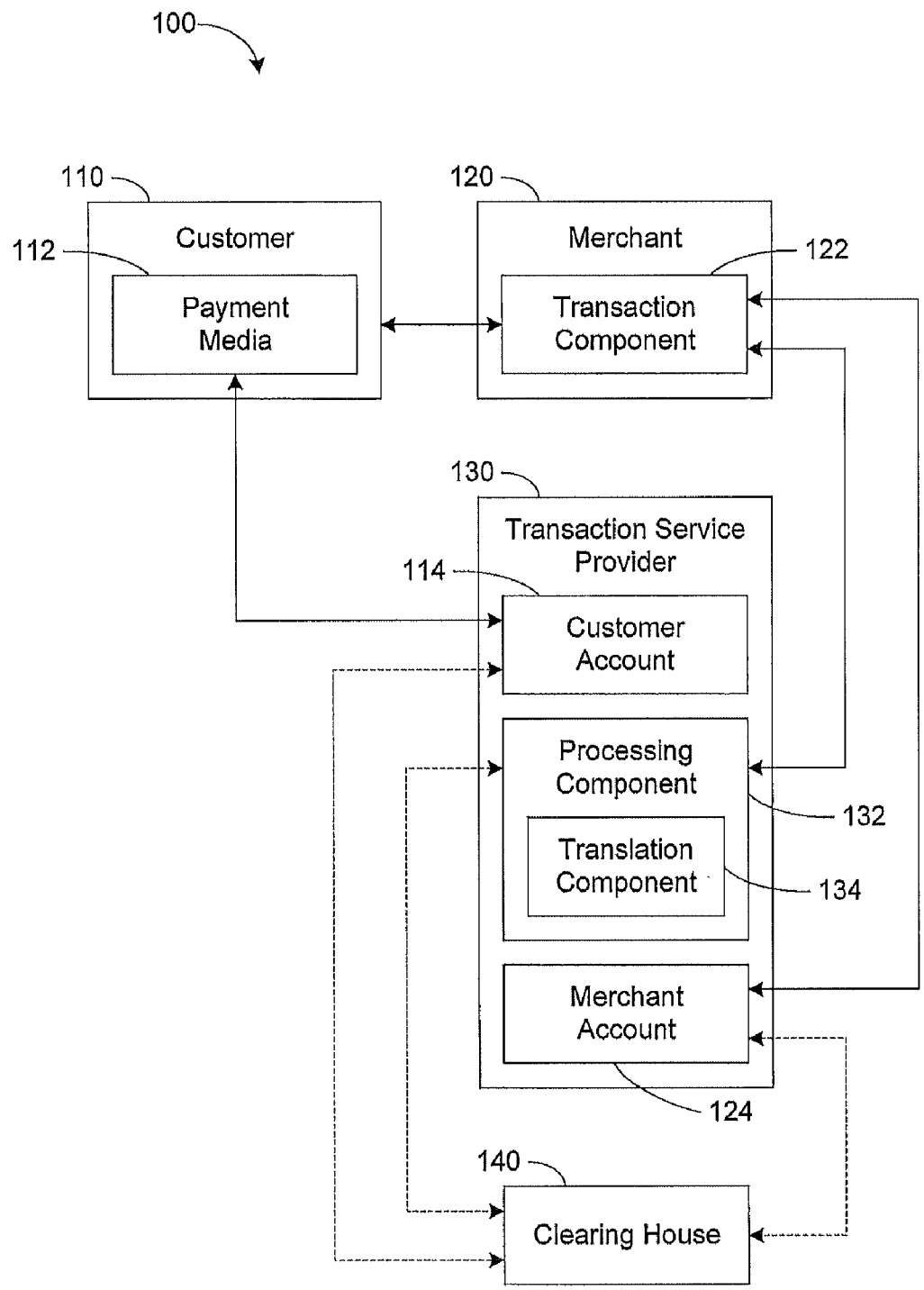

In one implementation, referring to FIG. 1C, the transaction service provider 130 may process the financial transaction by directly debiting the customer account 114 and directly crediting the merchant account 124 because both of the accounts 114, 124 are established with the transaction service provider 130. Optionally, in another implementation, the transaction service provider 130 may continue to process the transaction through the clearing house even though both of the accounts 114, 124 are established with the transaction service provider 130.

The transaction component 122, in one embodiment, is utilized by the merchant 120 to accept payment media from the customer 110. The transaction component 122 comprises a processing component, such as a payment transaction application. The transaction component 122 may comprise one or more functional components including a processing component and a communication component. Once acquired, transaction information related to the purchase transaction, the customer 110, and the payment media 112 may be transferred from the transaction component 122 of the merchant 120 to the processing component 132 of the transaction service provider 130 for processing.

In the event that the financial transaction is formatted for some other transaction service provider, the transaction service provider 130 utilizes the translation component 134 to interpret or translate the formatted financial transaction from the merchant 120 and thus process the financial transaction without the merchant 120 having to re-format the financial transaction. The translation component 134 is described in greater detail herein.

In one implementation, the online financial transaction takes place over an online communication network, such as the Internet. The payment media 112 of the customer 110 may include an interface device, such as a computer, that is adapted to allow the customer 110 to communicate with the merchant 120 and the transaction service provider 130 via the network. The transaction component 122 of the merchant 120 may include a server that is adapted to communicate with the customer 110 to allow viewing and purchase of items via the network and further communicate with the transaction service provider 130 to process financial transactions via the network. Similarly, the processing component 132 of the transaction service provider 130 may include a server that is adapted to communicate with the customer 110, the merchant 120 and the clearing house 140 to process and resolve financial transactions via the network.

The network, in one embodiment, may be implemented as a single network or a combination of multiple networks. For example, in various embodiments, the network may include the Internet, one or more intranets, landline networks, wireless networks, and/or some other appropriate type of communication network. In another example, the network may comprise a wireless telecommunications network (e.g., cellular phone network) adapted to communicate with other communication networks, such as the Internet.

The customer 110, in one embodiment, may use a network interface device, such as a personal computer or cell phone, to communicate with the merchant and/or access the customer account 114 via any appropriate combination of hardware and/or software configured for wired and/or wireless communication over the network. In one aspect, the customer 110 may use a browser application or other related software to browse information available over the network. For example, the customer may use a web browser to view information available over the Internet.

The customer 110, in one embodiment, may be prompted to provide identification information to the merchant 120 for transaction processing. For example, the identification information provided by the customer 110 may include personal information (e.g., a user name, password, photograph image, biometric id, address, phone number, etc.) and banking information (e.g., banking institution, credit card issuer, user account numbers, security information, etc.). In various implementations, identification information provided by the customer 110 may be passed with a purchase request to the processing component 132 of the transaction service provider 130 to associate the customer 110 with the customer account 114 maintained by the transaction service provider 130.

The merchant 120, in one embodiment, may maintain one or more merchant servers on the network for offering various items for purchase in exchange for payment to be received from the customer 110 over the network. As such, each of the one or more merchant servers may include a database for identifying available items, which may be made available to the customer 110 for viewing and purchase. Each of the merchant servers may include some form of a marketplace application configured to provide information over the network to the browser application used by the customer 110. For example, the customer 110 may interact with the marketplace application through the browser application over the network to search and view various items for purchase identified in the database. Each of the one or more merchant servers may include some form of checkout application configured to facilitate online purchase transactions by the customer 110 for items identified by the marketplace application. As such, the checkout application may be configured to accept payment information from the customer 110 over the network.

In various implementations, third party application providers (e.g., marketplace and/or checkout application providers, including shopping cart applications) may support one or more transaction service providers. As such, the translation component 134 may be adapted to provide shopping cart applications to the merchant 120 that may be currently transacting on other platforms to easily utilize the transaction service provider 130.

The merchant 120, in one embodiment, may provide identification information to be included as part of the transaction request. The identification information may include business and banking information. In various implementations, the identification information provided by the merchant 120 may be passed with the transaction request to the processing component 132 of the transaction service provider 130 to process the transaction, and the identification information provided by the merchant 120 may be used by the processing component 132 to associate the transaction with the merchant account 124.

The transaction service provider 130, in one embodiment, provides online payment processing for purchase transactions (e.g., online and/or offline purchase transactions) on behalf of the customer 110 and/or the merchant 120. In this regard, the processing component 132 utilizes a payment processing application configured to interact with the customer 110 and/or the merchant 120 to facilitate the processing of online financial transactions. In one example, the transaction service provider 130 may be provided by PayPal, Inc. of San Jose, Calif., USA.

The transaction service provider 130, in one embodiment, may be configured to maintain a plurality of customer and merchant accounts 114, 124, each of which may include account information associated with customers and merchants. For example, account information may include private financial information of the customer 110 and merchant 120, such as one or more account numbers, passwords, credit card information, banking information, or other types of financial information, which may be used to facilitate online financial transactions between the customer 110 and the merchant 120.

Figure 2A:
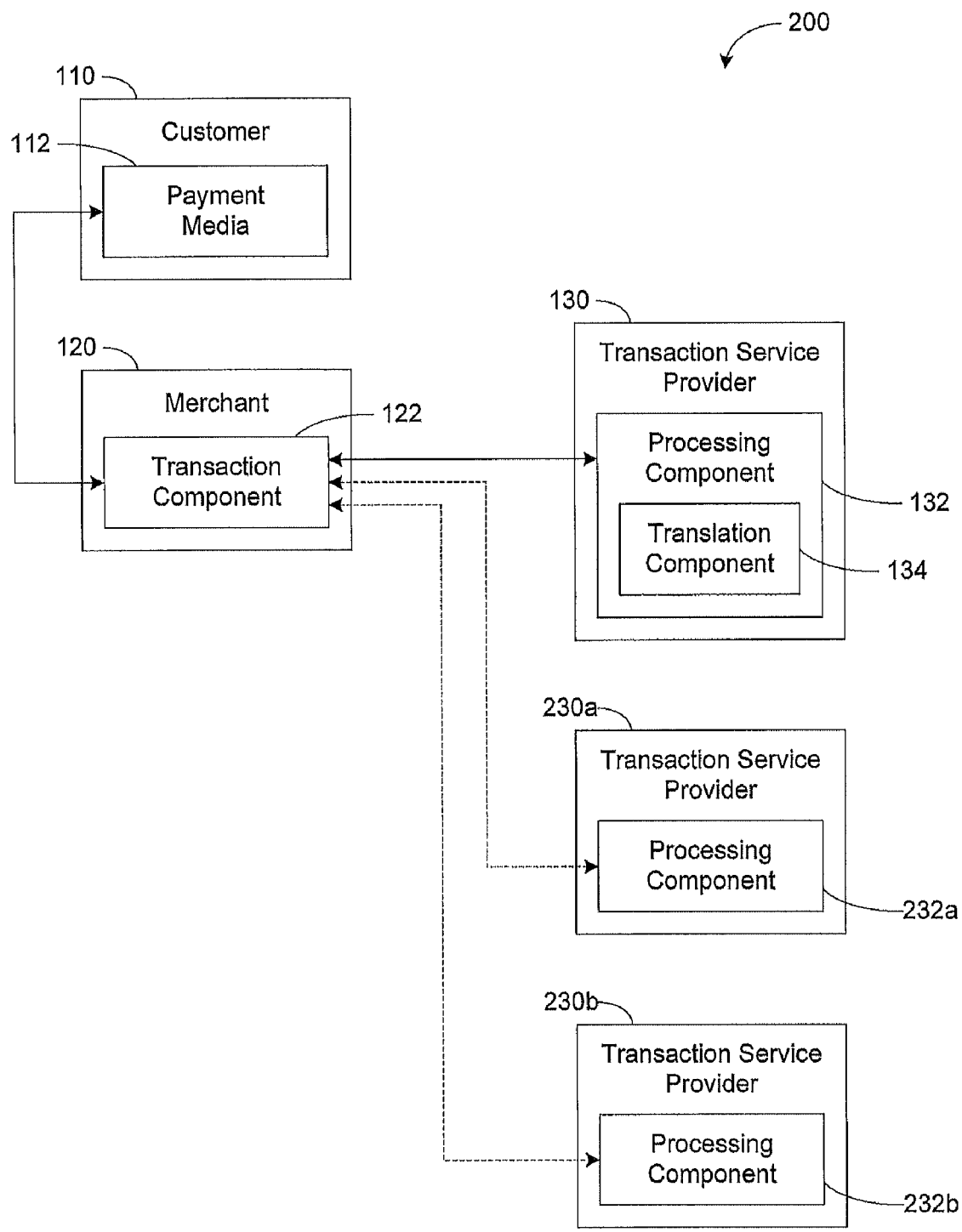
FIGS. 2A-2B show various block diagrams of various systems having a plurality of transaction service providers for facilitating financial transactions over a network, in accordance with one or more embodiments of the present disclosure.
Figure 2B:
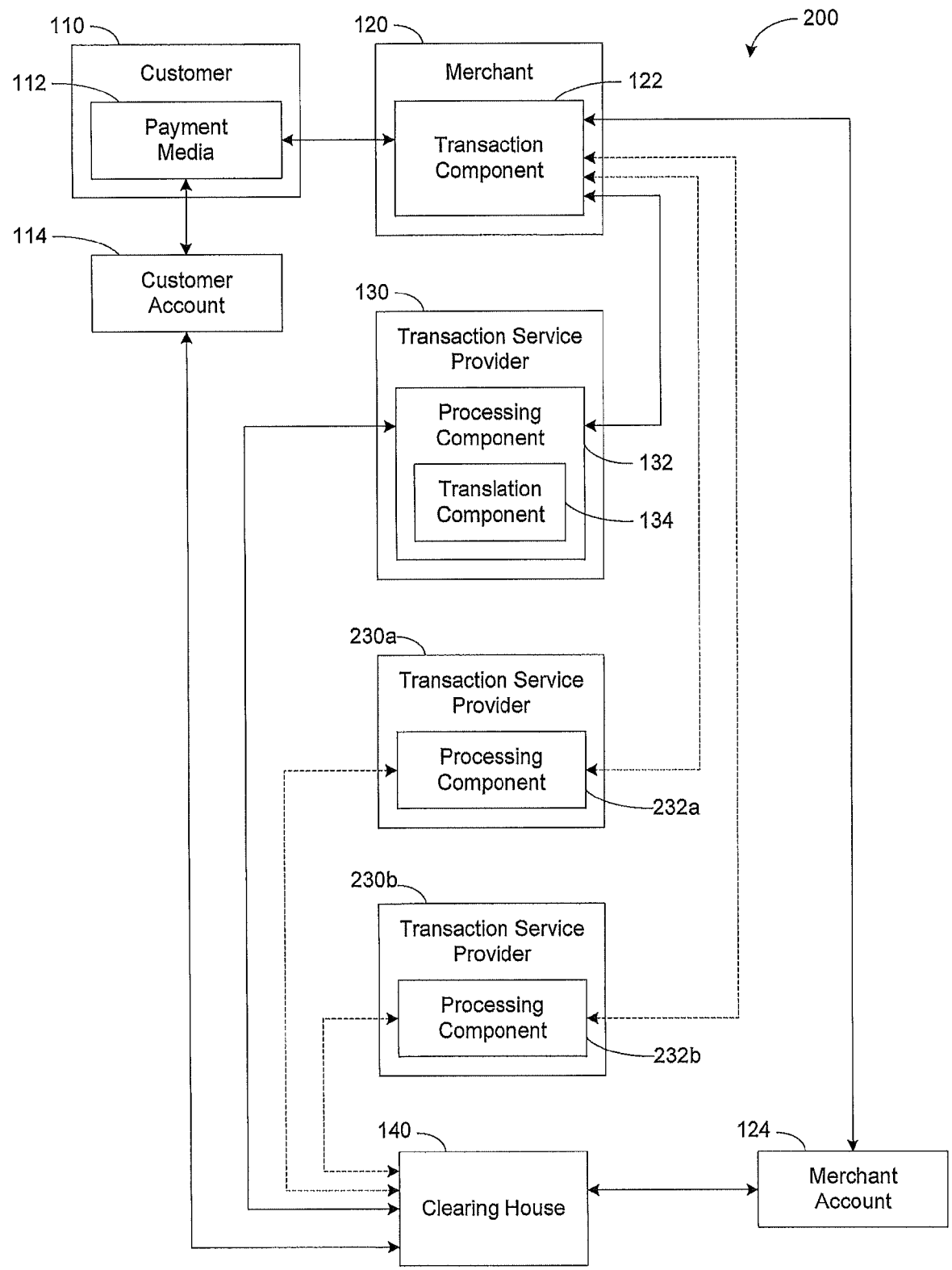

FIGS. 2A-2B show various embodiments of a system 200 for facilitating financial transactions over a network, such as the Internet. In reference to FIGS. 1A-1C, the system 200 includes the customer 110 providing the payment media 112 in exchange for purchase items from the merchant 120, and at least one of a plurality of transaction service providers 130, 230a, 230b are adapted to process the financial transaction between the customer 110 and the merchant 120 over the network. In one aspect, when the customer 110 purchases an item online, the online purchase transaction is processed via the network by an authorized transaction service provider, such as at least one of the first, second, or third transaction service providers 130, 230a, 230b having processing components 132, 232a, 232b. In various aspects of the present disclosure, some online purchase transactions may include processing credit card transactions.

In one implementation, the merchant 120 may choose to process purchase transaction requests from the customer 110 with at least one other transaction service provider, such second or third providers 230a, 230b, which requires the transaction to be formatted with processing software for use only with those providers 230a, 230b. If the merchant 120 wants to change transaction service providers, the merchant 120 may be required to re-format purchase transaction requests in a particular format recognizable by the newly selected transaction service provider.

However, as described above in reference to FIGS. 1A-1C, the first transaction service provider 130 comprises the processing component 132 and the translation component 134 (e.g., an interpretation module) that is adapted to receive merchant transactions formatted for some other transaction service provider, such as either of the second and third transaction service providers 230a, 230b, translate or interpret the coded transaction request from the merchant 120, and process the transaction request as if formatted for the first transaction service provider 130. As such, in one aspect, the translation component 134 eliminates the need for the merchant 120 to re-format the purchase transaction requests in a particular format recognizable by the first transaction service provider 130 to process transaction requests. As a result, if the merchant 120 wants to use the first transaction service provider 130, then the merchant 120 merely sends online purchase transactions to the first transaction service provider 130 in any recognizable format for processing by the first transaction service provider 130.

As previously described in reference to FIGS. 1C-1D, the first transaction service provider 130 comprises the translation component 134 that allows the processing component 132 to process online financial transactions intended for some other transaction service provider or payment processor (e.g., the second and third transaction service providers 230a, 230b) on the network. In the event that the financial transaction is formatted for some other transaction service provider 230a, 230b, then the transaction service provider 130 utilizes the translation component 134 to translate or interpret the formatted financial transaction request from the merchant 120 and thus process the financial transaction without the merchant 120 having to re-format the financial transaction. In various embodiments, the transaction service provider 130 or a website related thereto may be referred to as a gateway, and the translation component 134 may be referred to as a gateway adapter, without departing from the scope of the present disclosure.

Figure 3:
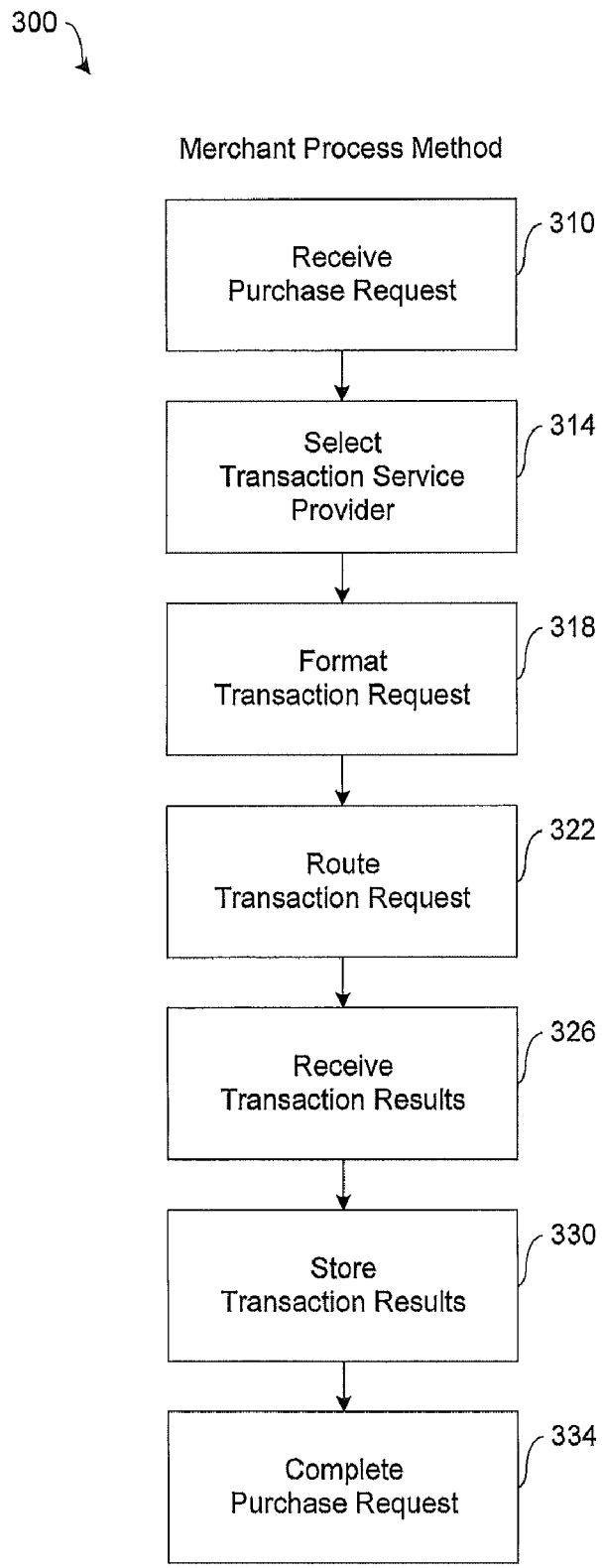
FIG. 3 shows a block diagram of a merchant process method for facilitating financial transactions over a network, in accordance with one or more embodiments of the present disclosure.

FIG. 3 shows one embodiment of a merchant process method 300 for facilitating financial transactions over a network, such as the Internet. The following description of the merchant process method 300 references FIGS. 1A-2B.

In one implementation, the merchant 120 receives a purchase request from the customer 110 via the network (block 310). In various examples, the customer 110 utilizes payment media 112, such as an electronic check resource, customer account balance, credit card, or debit card to purchase items from the merchant 120 over the network. The merchant 120 utilizes the transaction component 122 to generate a transaction request for processing of the online financial transaction over the network.

Next, the merchant 120 selects a transaction service provider 130, 230a, 230b (block 314), formats the transaction request (block 314) for the selected transaction service provider 130, 230a, 230b (block 318), and routes the transaction request to the first transaction service provider 130 having the translation component 134 (block 322). As previously described in reference to FIGS. 2A, 2B, the merchant 120 may choose to process transaction requests from the customer 110 with the second or third transaction service providers 230a, 230b, which requires the transaction to be formatted with processing software for use only with those providers 230a, 230b. However, since the first transaction service provider 130 comprises the translation component 134, the processing component 132 is adapted to receive merchant transactions formatted for some other transaction service provider, such as either of the second and third transaction service providers 230a, 230b, translate the coded transaction request from the merchant 120, and then process the transaction request as if formatted for the first transaction service provider 130. As such, the merchant 120 may utilize the first transaction service provider 130 by routing transaction requests to the first transaction service provider 130 in any recognizable format for processing.

Next, the merchant 120 receives transaction results from the first transaction service provider 130 via the network (block 326), stores the received transaction results (block 330), and then completes the purchase request with the customer 110 (block 334). In one aspect, the merchant 120 stores or archives the received transaction results in a storage component (e.g., database) for reference and/or analysis. In another aspect, the merchant 120 may complete the purchase request with the customer 110 by sending a receipt related to the completed purchase transaction to the customer 110 via the network.

Figure 4:
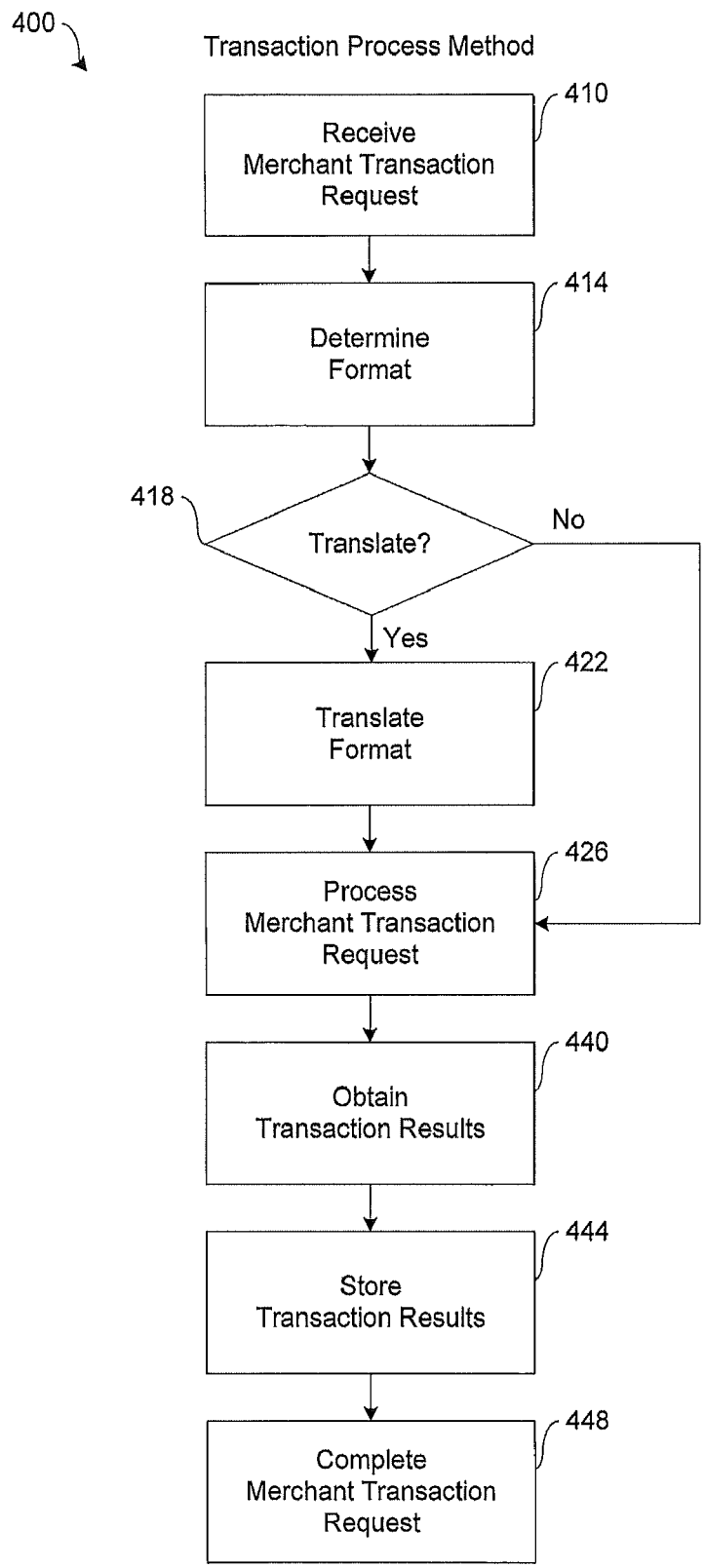
FIG. 4 shows a block diagram of a transaction process method for facilitating financial transactions over a network, in accordance with one or more embodiments of the present disclosure.

FIG. 4 shows one embodiment of a transaction process method 400 for facilitating financial transactions over a network, such as the Internet. The following description of the transaction processing method 400 references FIGS. 1A-2B.

In one implementation, the first transaction service provider 130 receives a merchant transaction request from the merchant 120 via the network (block 410), and then the first transaction service provider 130 determines the format of the merchant transaction processing request (block 414).

Next, if the first transaction service provider 130 determines that the merchant transaction request needs format translation (block 418), then the first transaction service provider 130 utilizes the translation component 134 to translate the format for processing (block 422), and then the first transaction service provider 130 processes the merchant transaction request (block 426). Otherwise, if the first transaction service provider 130 determines that the merchant transaction request does not need format translation (block 418), then the first transaction service provider 130 proceeds to process the merchant transaction request (block 426).

In one implementation, the transaction service provider 130 translates the merchant transaction request into an internal representation. As such, supporting another transaction service provider (e.g., the second and/or third providers 230a, 230b) may result in translating a new payment request representation without altering workflow. In another implementation, merchant transaction responses may be translated to allow the transaction component 122 to correctly interpret the transaction results for other transaction service providers, such as the second and/or third providers 230a, 230b.

As previously described in reference to FIGS. 1A-2B, the first transaction service provider 130 utilizes the translation component 134 to process merchant transaction requests intended for some other transaction service provider or payment processor on the network, such as the second or third transaction service providers 230a, 230b. In the event that the financial transaction is formatted for at least one other transaction service provider 230a, 230b, then the transaction service provider 130 utilizes the translation component 134 to translate the formatted merchant transaction request from the merchant 120 and thus process the financial transaction without the merchant 120 having to re-format the financial transaction. In various aspects of the present disclosure, the transaction service provider 130 or a website related thereto may be referred to as a gateway, and the translation component 134 may be referred to as a gateway adapter.

Next, after processing is complete, the first transaction service provider 130 obtains transaction results for the merchant transaction request (block 440), stores the obtained transaction results (block 444), and then completes the merchant transaction request with the merchant 120 (block 448). In one aspect, the first transaction service provider 130 stores or archives the transaction results in a storage component (e.g., database) for reference and/or analysis. In another aspect, the first transaction service provider 130 may complete the merchant transaction request with the merchant 120 by sending data and information related to the transaction results to the merchant 120 via the network. The transaction results may include information related to resolving the merchant transaction request including validation information, delivery information, and settlement information as provided by a settlement agency or institution (e.g., clearing house) having a system for settling indebtedness between members of that system through which accounts may be debited and/or credited of monetary funds in a generally known manner as accepted by the banking industry.

Figure 5:
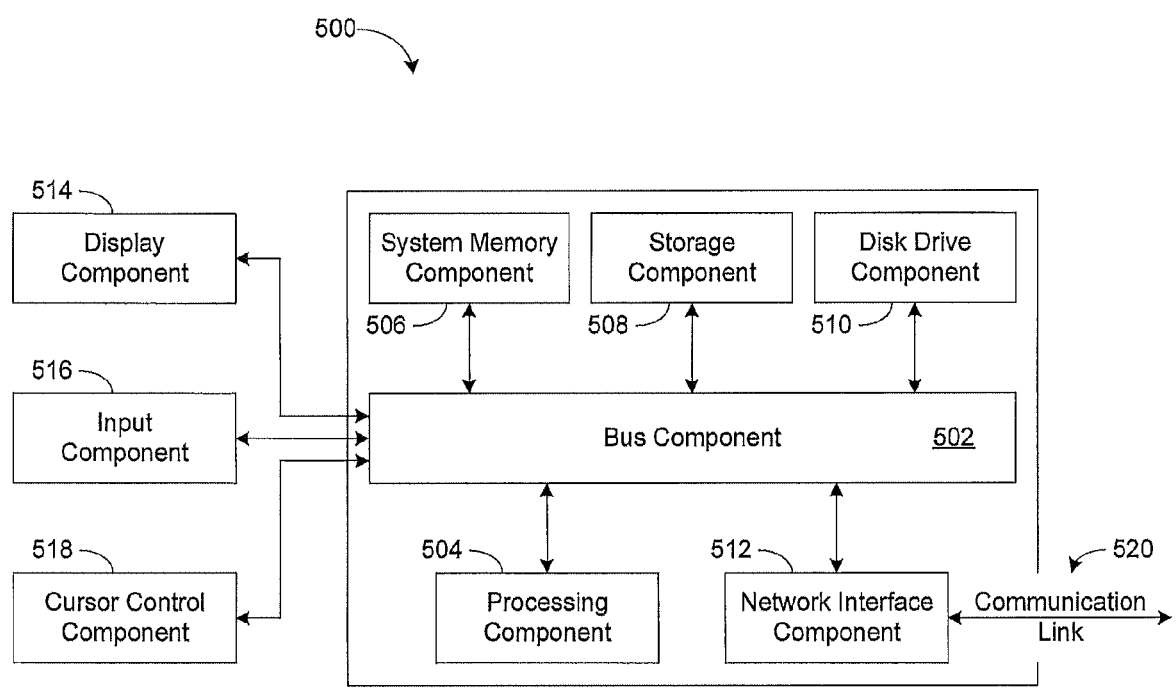
FIG. 5 is a block diagram of a computer system suitable for implementing one or more embodiments of the present disclosure.

FIG. 5 is a block diagram of a computer system 500 suitable for implementing embodiments of the present disclosure. In various implementations, the customer 110 may utilize a client device, which may comprise a personal computing device, such as a personal computer, laptop, PDA, etc., each transaction component 122 utilized by each merchant 120 may comprise a network computing device, such as a server, and the processing component 132 of the transaction service provider 130 may comprise a network computing device, such as a server. Thus, it should be appreciated that the devices utilized by the customer 110, each merchant 120, and the transaction service provider 130 may be implemented as computer system 500 in a manner as follows.

In accordance with various embodiments of the present disclosure, computer system 500, such as a personal computer and/or a network server, includes a bus 502 or other communication mechanism for communicating information, which interconnects subsystems and components, such as processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., CRT or LCD), input component 516 (e.g., keyboard), and cursor control component 518 (e.g., mouse or trackball). In one implementation, disk drive component 510 may comprise a database having one or more disk drive components.

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement one or more embodiments of the present disclosure.

Logic may be encoded in a computer readable medium, which may refer to any medium that participates in providing instructions to processor 504 for execution. Such a medium may take many forms, including but not limited to, non-volatile media and/or volatile media. In various implementations, non-volatile media may include optical or magnetic disks, such as disk drive component 510 and volatile media may include dynamic memory, such as system memory component 506. In one aspect, data and information related to execution instructions may be transmitted to computer system 500 via transmission media, such as coaxial cables, copper wire, and fiber optics, including wires that comprise bus 502. In various examples, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the aspects of the present disclosure may be performed by computer system 500. In various other embodiments of the present disclosure, a plurality of computer systems 500 coupled by communication link 520 (e.g., network 160 of FIG. 1, LAN, WLAN, PTSN, or various other wired or wireless networks) may perform instruction sequences to practice various aspects of the present disclosure in coordination with one another.

Computer system 500 may transmit and receive messages, data, information and instructions, including one or more programs (i.e., application code) through communication link 520 and network interface component 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described various embodiments of the present disclosure, persons of ordinary skill in the art will recognize that changes may be made in form and detail without departing from the scope of the present disclosure. Thus, the present disclosure should be limited only by the claims.

We claim:

1. A system for facilitating financial transactions over a network, the system comprising:
   a first transaction service provider adapted to interface with the network to facilitate financial transactions with respective financial institutions of a merchant and a customer of the merchant; and,
   a merchant device adapted to directly communicate with the first transaction service provider over the network;

wherein the first transaction service provider comprises:
a communication component adapted to communicate with the merchant via the merchant device over the network; and,
a processing component configured to
receive a merchant transaction processing request from the merchant via the merchant device over the network, the merchant transaction processing request including information related to a financial transaction between the merchant and the customer and being formatted for processing by one of a plurality of transaction service providers, each having a transaction processing request format that is different from those of respective ones of the other transaction service providers;
determine whether the received merchant transaction request is formatted for processing by the first transaction service provider or for processing by one of the plurality of transaction service providers other than the first;
translate all merchant transaction processing requests formatted for processing by one of the plurality of other transaction service providers into merchant transaction processing requests formatted for processing by the first transaction service provider; and,
process all merchant transaction processing requests formatted for processing by the first transaction service provider and all translated merchant transaction processing requests directly with the respective financial institutions of the merchant and the customer and independently of any of the other transaction service providers.

2. The system of claim 1, wherein the processing component is adapted to obtain transaction results after processing the merchant transaction request.

3. The system of claim 2, wherein the transaction results include information related to resolving the merchant transaction request including validation information, delivery information, and settlement information.

4. The system of claim 2, the first transaction service provider further comprising a storage component, and wherein the processing component is adapted to store the transaction results in the storage component.

5. The system of claim 1, wherein the processing component is adapted to utilize a payment processing application to process the merchant transaction processing request.

6. The system of claim 1, wherein the processing component is adapted to maintain a plurality of accounts for one or more merchants and customers, and wherein the accounts include account information related to the one or more merchants and customers.

7. The system of claim 6, wherein the account information comprises private financial information of the merchants and the customers including at least one or more account numbers, passwords, credit card information, and banking information.

8. The system of claim 1, wherein the merchant device comprises a server adapted to communicate with the communication component via the network, and wherein the merchant transaction processing request further includes information related to at least one of an online financial transaction and an offline financial transaction between the merchant and the customer.

9. A method for facilitating financial transactions over a network by a first transaction service provider with respective financial institutions of a merchant and a customer of the merchant, the method comprising:
at a first gateway server associated with the first transaction service provider, communicating with the merchant via a merchant device over the network;
at the first gateway server, receiving a merchant transaction processing request from the merchant via the merchant device over the network, the merchant transaction processing request including information related to a financial transaction between the merchant and the customer and being formatted for processing by one of a plurality of transaction service providers, each having a transaction processing request format that is different from respective ones of those of the other transaction service providers;
at the first gateway server, determining whether the received merchant transaction processing request is formatted for processing by the first transaction service provider or for processing by one of the plurality of transaction service providers other than the first;
at the first gateway server, translating all merchant transaction requests formatted for processing by one of the plurality of the other transaction service providers into merchant transaction processing requests formatted for processing by the first transaction service provider; and,
at the first gateway server, processing all merchant transaction processing requests formatted for processing by the first transaction service provider and all translated merchant transaction processing requests directly with the respective financial institutions of the merchant and the customer and independently of any of the other transaction service providers.

10. The method of claim 9, further comprising, at the first gateway server, obtaining transaction results after processing the merchant transaction processing request.

11. The method of claim 10, wherein the transaction results include information related to resolving the merchant transaction request including validation information, delivery information, and settlement information.

12. The method of claim 10, further comprising, at the first gateway server, storing the transaction results in a storage component.

13. The method of claim 9, wherein processing the merchant transaction processing request includes utilizing a payment processing application for processing the merchant transaction request.

14. The method of claim 9, further comprising, at the first gateway server, maintaining a plurality of accounts for one or more merchants and customers, and wherein the accounts include account information related to the one or more merchants and customers.

15. The method of claim 14, wherein the account information comprises private financial information of the merchants and the customers including at least one or more account numbers, passwords, credit card information, and banking information.

16. The method of claim 9, wherein the merchant device comprises a server adapted to communicate with the network, and wherein the merchant transaction request includes information related to at least one of an online financial transaction and an offline financial transaction between the merchant and the customer.

17. Software encoded in one or more non-transitory computer readable media and when executed on a processor operable to:
communicate with a merchant via a merchant device over the network;

receive a merchant transaction processing request from the merchant via the merchant device over the network, the merchant transaction processing request including information related to a financial transaction between the merchant and a customer purchasing an item from the merchant, the merchant transaction request being formatted for processing by one of a plurality of transaction service providers, each having a transaction request processing format different from those of respective ones of the other transaction service providers;

determine whether the received merchant transaction processing request is formatted for processing by a first transaction service provider or for processing by a transaction service provider other than the first;

translate all merchant transaction processing requests formatted for processing by the other transaction service providers into merchant transaction processing requests formatted for processing by the first transaction service provider; and, process all merchant transaction processing requests formatted for processing by the first transaction service provider and all translated merchant transaction processing requests directly with the respective financial institutions of the merchant and the customer and independently of any of the other transaction service providers.

18. The software of claim 17, further operable to obtain transaction results after process of the merchant transaction request.

19. The software of claim 18, wherein the transaction results include information related to resolving the merchant transaction request including validation information, delivery information, and settlement information.

20. The software of claim 18, further operable to store the transaction results in a storage component.

\* \* \* \* \*